A. E. WEINE.
SCALE.
APPLICATION FILED APR. 10, 1920.
1,400,469.
Patented Dec. 13, 1921.
3 SHEETS—SHEET 1.
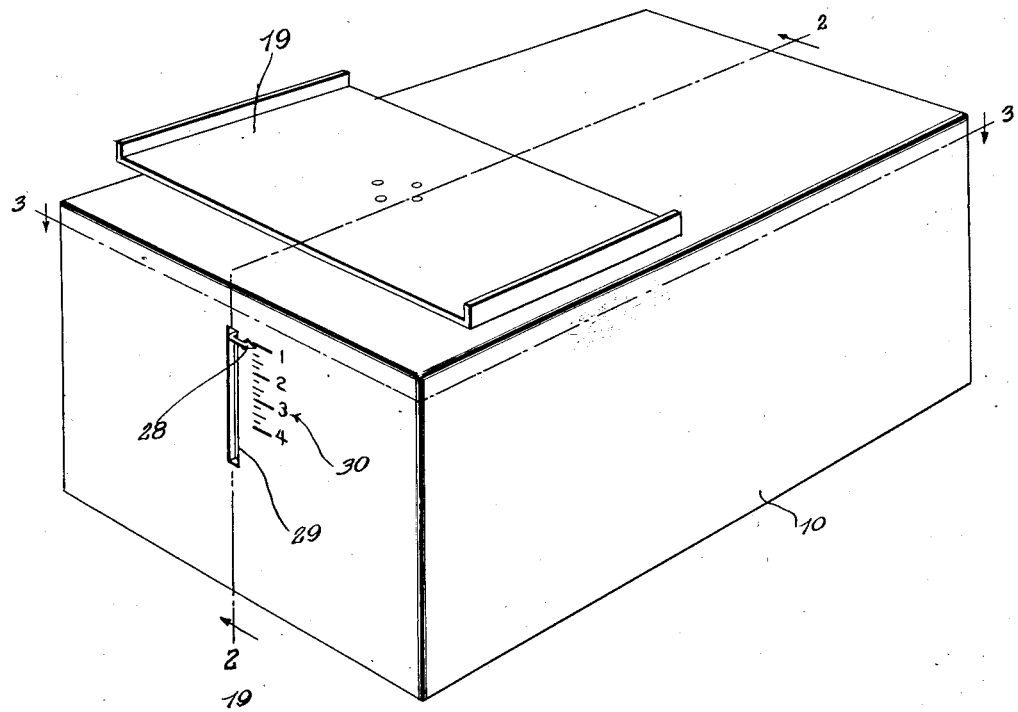
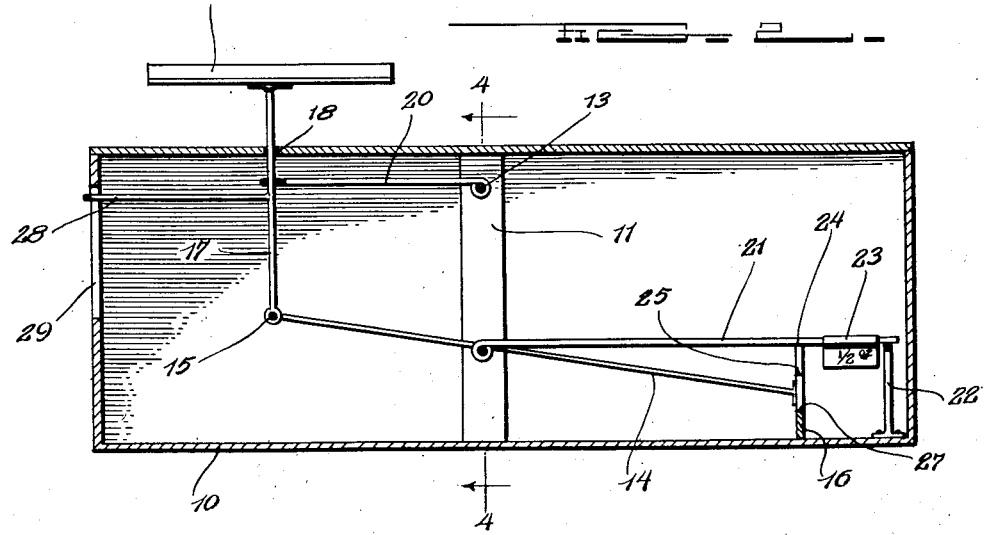
Albert E. Weine
INVENTOR
BY Victor J. Evans
ATTORNEY
WITNESS:

A. E. WEINE.
SCALE.
APPLICATION FILED APR. 10, 1920.
1,400,469. Patented Dec. 13, 1921.
3 SHEETS—SHEET 2.
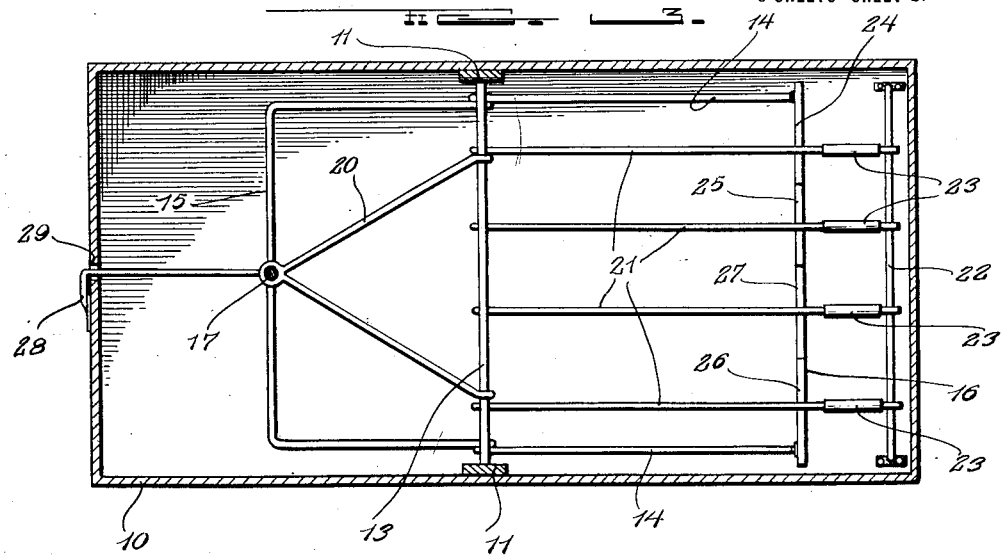
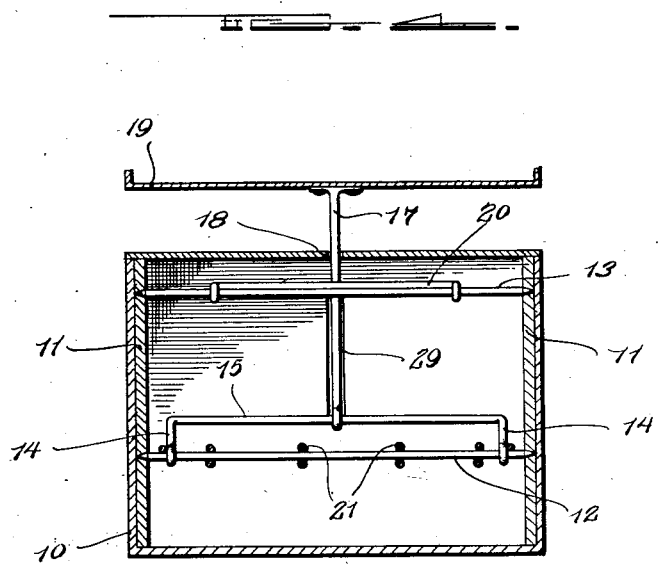
Albert E. Weine
INVENTOR
BY Victor J. Evans
ATTORNEY
WITNESS A. E. WEINE.
SCALE.
APPLICATION FILED APR. 10, 1920.
1,400,469.
Patented Dec. 13, 1921.
3 SHEETS—SHEET 3.
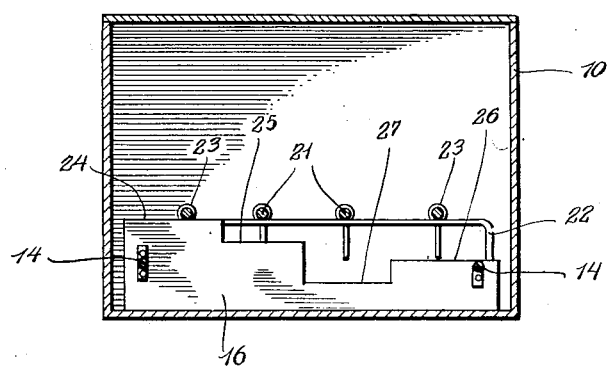
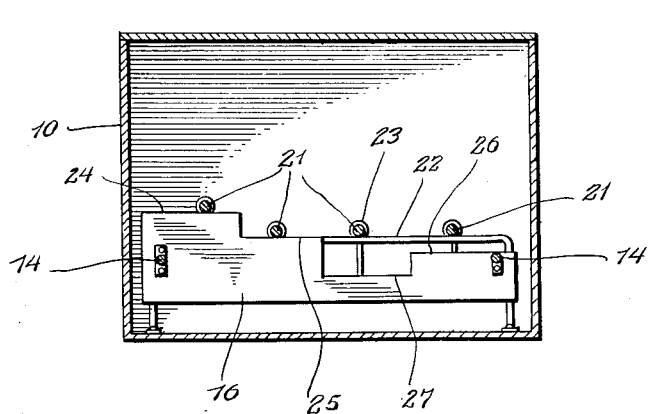
Albert E. Weine
INVENTOR
BY Victor J. Evans
ATTORNEY
WITNESS

UNITED STATES PATENT OFFICE.

ALBERT E. WEINE, OF ALPENA, MICHIGAN.

SCALE.

1,400,469.

Specification of Letters Patent.   Patented Dec. 13, 1921.

Application filed April 10, 1920. Serial No. 372,855.

*To all whom it may concern:*

Be it known that I, ALBERT E. WEINE, citizen of the United States, residing at Alpena, in the county of Alpena and State of Michigan, have invented new and useful Improvements in Scales, of which the following is a specification.

This invention relates to a scale and has for an object the provision of a scale especially adapted for weighing letters or other parcels of mail matter.

An object of the present invention is the provision of a scale of a sensitive character which is adapted to postal use and which will indicate weight only in units of ounces and will not respond to fractions of an ounce. In other words, if a parcel or letter is placed upon the scale which weighs exactly one ounce, its weight will be so indicated, but should the parcel or letter weigh in excess of one ounce or less than two ounces, the scale will indicate two ounces. Thus, the amount of postage necessary may be readily determined.

Another object is the provision of a novel arrangement of counterbalance and weight actuating beam in which the weight acts as a stop to limit the movement of a beam in accordance with the weight placed upon the scale platform.

The invention further consists in the following novel features and details of construction, to be hereinafter more fully described, illustrated in the accompanying drawings and pointed out in the claims hereto appended.

In the drawings:—

Figure 1 is a perspective view of a postal scale embodying the present invention.

Fig. 2 is a section of the line 2—2 of Fig. 1.

Fig. 3 is a section of the line 3—3 of Fig. 1 showing the scale mechanism in plan.

Fig. 4 is a section of the line 4—4 of Fig. 2 looking in the direction of the arrow.

Fig. 5 is a fragmentary perspective view of one end of the scale mechanism with the counterbalance beam and weighted arms in normal position.

Fig. 6 is a view similar to Fig. 5 showing the position of the parts when a letter or parcel weighing one ounce has been placed on the platform.

Referring to the drawings in detail, like characters of reference denote corresponding points throughout the several views.

As illustrated, the scale includes a casing of suitable configuration and material which is indicated 10. This casing contains the scale mechanism which includes a pair of spaced vertically arranged standards 11, providing bearings for a pair of horizontally disposed spaced transverse bars 12 and 13. The first mentioned bar is designed to pivotally support a frame which includes side bars 14, secured to the bar 12, a transverse end bar 15 and a beam 16. This provides a rectangular horizontally arranged pivoted frame, from one end of which rises a standard 17. The lower end of this standard is pivotally secured with the connecting bar and extends upwardly through an opening 18 in the top of the casing 10 and has mounted thereon a platform 19. This platform is for the purpose of receiving articles to be weighed and is rigidly secured to the top of the standard 17. The said standard is guided in its vertical movement through the medium of a V shaped frame 20, the point of which is pivotally connected to the standard 17, while the opposite arms of the V are secured to the above frame 13.

The bar or beam 16 is preferably formed of a strip of flat metal arranged on edge and is of sufficient weight to act as a counterbalance for the platform 19, so that the latter will readily respond to any weight placed thereon. If desired, the pivots of the bars 12 and 13 may be pointed to reduce friction and increase the sensitive action of the scale.

Pivotally secured to the bar 12 and arranged in spaced relation is a plurality of longitudinal disposed arms 21, the free ends of these arms normally rising upon a stationary bar or support 22 located at the end of the casing 10 and beyond the rod or beam 16. The arms 21 are each provided with a weight 23, in the present instance a half-ounce weight and the length of the arms 21 are substantially equal to twice the distance between the rod 12 and the bar 15. The upper edge of a counterbalance 16 is irregular or cut away to provide surfaces 24, 25, 26 and 27 of different elevations, arms 21 being normally in contact with the surface 24 so that the weight will hold the platform in elevated position until the letter or parcel of sufficient weight has been placed thereon to over-balance the weight 23.

In the use of the invention should a letter or parcel be placed upon the platform 19 and its weight be one ounce or any fraction thereunder, the arm in contact with the surface 24 will be elevated until the surface 25 contacts with the arm immediately above it, whereupon, its movement will be arrested. This position of the parts is shown in Fig. 6 of the drawings. Should however, the letter or parcel weigh in excess of one ounce and not over two ounces, the arm immediately above the surface 25 will be elevated until the surface 26 contacts with its respective arm. As shown in the drawings there are four of these arms and the capacity of the same is therefore four ounces. This however, may be varied as desired.

In order to determine the weight of the package the standard 17 carries a pointer 28, which operates a slot 29 provided in the end of the casing 10 and indicates the weight upon the graduations 30 arranged adjacent to said slot.

The invention is susceptible of various changes in its form, proportions and minor details of construction and the right is reserved to make such changes as properly fall within the scope of the appended claims.

Having described the invention what is claimed is:—

1. A scale embodying a horizontally pivoted frame, said frame including a transverse pivot bar, a plurality of longitudinally extending spaced arms each having one of its ends pivotally secured to the bar and capable of independent movement, a weight secured to the free end of each of the arms, each of said weights being of the same weight, a platform connected to the frame and means carried by the frame whereby, when the platform is depressed one or more of the arms will be elevated to determine the weight of an article upon the platform.

2. A scale embodying a horizontally pivoted frame, said frame including a transverse pivot bar, a plurality of longitudinally extending spaced arms each having one of its ends pivotally secured to the bar and capable of independent movement, a weight secured to the free end of each of the arms, each of said weights being of the same weight, a platform connected to the frame and a transversely arranged vertically movable bar connected in the frame and having an upper irregular edge adapted to successively engage one or more of the arms to elevate the latter to determine the weight of an article upon the platform.

In testimony whereof I affix my signature.

ALBERT E. WEINE.